United States Patent [19]
Tanaka et al.

[11] Patent Number: 5,694,254
[45] Date of Patent: Dec. 2, 1997

[54] LENS BARREL WITH A ROTATIONAL MOTION TRANSMITTING PORTION

[75] Inventors: Masatsune Tanaka, Kuroiso; Junichi Kurita, Ohtawara, both of Japan

[73] Assignee: Nikon Corporation, Tokyo, Japan

[21] Appl. No.: 701,793

[22] Filed: Aug. 26, 1996

[30] Foreign Application Priority Data

Aug. 31, 1995 [JP] Japan .................................. 7-223026

[51] Int. Cl.⁶ .................................................. G02B 15/14
[52] U.S. Cl. .................................. 359/701; 359/699
[58] Field of Search ............................. 359/813, 822, 359/823, 826, 694, 696, 697, 698, 699, 700, 701, 704

[56] References Cited

U.S. PATENT DOCUMENTS

| | | | |
|---|---|---|---|
| 2,873,646 | 2/1953 | Angenieux | 359/701 |
| 3,765,748 | 10/1973 | Mito | 359/701 |
| 5,218,479 | 6/1993 | Chiou et al. | 359/700 |
| 5,285,322 | 2/1994 | Horning et al. | 359/826 |

FOREIGN PATENT DOCUMENTS 6-82667  3/1994  Japan.

*Primary Examiner*—Georgia Y. Epps
*Assistant Examiner*—Ricky Mack

[57] ABSTRACT

A lens barrel including a lens holding cylinder holding a lens unit and rotatable about the optical axis of the lens barrel, and a holding cylinder rotating mechanism for rotatively moving the lens holding cylinder to thereby move the lens unit along the optical axis, the holding cylinder rotating mechanism having a rotatable portion disposed outside a fixed cylinder and effecting rotational motion, a rotational motion transmitting portion for transmitting only the rotational motion about the optical axis of the rotational motion of the rotatable portion to the inside of the fixed cylinder, and a holding cylinder rotating portion for transmitting the motion of the rotational motion transmitting portion along the direction of the optical axis and rotating the lens holding cylinder.

5 Claims, 4 Drawing Sheets

LENS BARREL WITH A ROTATIONAL MOTION TRANSMITTING PORTION

BACKGROUND OF THE INVENTION

1. Field of the Invention

This invention relates to a lens barrel, and particularly to a lens barrel improved in a mechanism for transmitting a drive force to a lens unit.

2. Related Background Art

FIG. 1 of the accompanying drawings is a fragmentary cross-sectional view of a lens barrel according to the prior art which is capable of performing a zooming operation. FIG. 2 of the accompanying drawings is a fragmentary developed view of a fixed cylinder 5 used in the lens barrel shown in FIG. 1, and FIG. 3 of the accompanying drawings is a fragmentary developed view of a cam ring 8. The construction of the lens barrel according to the prior art will hereinafter be briefly described with reference to these figures.

The lens barrel shown in FIG. 1 has five lens units, i.e., lens units L1–L4 and a lens unit, not shown, disposed forwardly of the optical axis of the lens unit L1 of these lens units, the lens units L2, L3 and L4 are lens units moved back and forth in the direction of the optical axis only during zooming, while the lens unit L1 is a lens unit moved back and forth in the direction of the optical axis during zooming and focusing.

A slidable cylinder 1 is a lens holding cylinder holding the lens unit L1 on the inner peripheral side thereof, and is disposed on the inner peripheral side of a fixed cylinder 5 through a slidable cylinder 2 holding the lens unit L2, a slidable cylinder 3 holding the lens unit L4, and further a cam ring 4. The slidable cylinder 1 has a cam pin 6 installed on the outer peripheral surface thereof. The cam pin 6 is provided with a roller 7 on the outer periphery thereof, and extends through a cam slot 4a formed in the cam ring 4 and escape portions 5a and 8a (see FIGS. 2 and 3 of the accompanying drawings) formed in the fixed cylinder 5 and a cam ring 8, respectively, and has its tip end portion engaged with a rectilinear groove 9a parallel to an optical axis A which is formed in the inner periphery of a rotatable cylinder 9. The cam slot 4a is a cam slot for prescribing the zooming operation and focusing operation of the lens unit L1, and the roller 7 is a member provided so that the cam pin 6 may effect smooth movement relative to the cam slot 4a, etc.

The rotatable cylinder 9 disposed outside the fixed cylinder 5 is a cylindrical member rotated about the optical axis A when the focusing of the optical system is effected. The rotatable cylinder 9 has transmitted thereto a drive force in the direction of rotation about the optical axis A from a focusing ring 10 rotatively operated from the outside or a power transmitting mechanism (not shown) for transmitting power from a power source installed in a camera body, through a conventional mechanism, and effects rotational motion.

A zoom ring 11 is manually operated when the zooming operation of the optical system is performed. The zoom ring 11 is integral with the cam ring 8 so as not to move in the direction of the optical axis A by its inner periphery engaged with a cam pin 12 installed on the rear end portion of the outer peripheral surface of the cam ring 8.

The cam ring 8 is a cylindrical member rotatably fitted to the outer peripheral surface of the fixed cylinder 5, and has in the rear end portion thereof a rectilinear groove 8b parallel to the optical axis A, and is engaged with a cam pin 13 in this rectilinear groove 8b. The cam pin 13 is installed on the outer peripheral surface of the cam ring 4, and by this cam ring 4, the cam ring 8 and the cam ring 4 are made integral so as not to move in the direction of the optical axis A.

The focusing operation of the lens barrel according to the prior art will now be described.

When the focusing operation is to be performed in the lens barrel according to the prior art, power is transmitted from a power source installed in the camera body to the rotatable cylinder 9 through the aforementioned power transmitting mechanism, or the rotational motion of the focusing ring 10 manually operated is transmitted to the rotatable cylinder 9 to thereby rotate the rotatable cylinder 9. The rotational motion of the rotatable cylinder 9 in turn is transmitted to the slidable cylinder 1 through the cam pin 6 and the roller 7 (hereinafter referred to as the "cam pin 6, etc."). At this time, the cam ring 4 through which the cam pin 6, etc. extend is immovable in the direction of rotation about the optical axis A and therefore, the cam pin 6, etc. effect motion relative to the cam slot 4a and move back and forth in the direction of the optical axis A along the shape of the cam slot 4a. As a result, the slidable cylinder 1 moves back and forth in the direction of the optical axis A while rotating, and the lens unit L1 becomes disposed at a position whereat the optical system is in focus.

The zooming operation of the lens barrel according to the prior art will now be described.

When the zooming operation is to be performed, the zoom ring 11 is rotated by an extraneous operation. The rotational motion of the zoom ring 11 is transmitted to the cam ring 8 through the cam pin 12, and is further transmitted to the cam ring 4 through the cam pin 13. At this time, the rotatable cylinder 9 is inhibited from rotating by the aforedescribed power transmitting mechanism, etc. and therefore, the cam pin 6, etc. are immovable in the direction of rotation. Accordingly, relative motion takes place between the cam pin 6, etc. and the cam slot 4a, and the cam pin 6, etc. move back and forth in the direction of the optical axis A in accordance with the shape of the cam slot 4a. As a result, the slidable cylinder 1 does not rotate, but rectilinearly moves in the direction of the optical axis A, and the lens unit L1 becomes disposed at a position whereat the optical system realizes a focal length to be found.

In the aforedescribed lens barrel according to the prior art, however, the cam pin 6, etc. for transmitting a drive force to the lens unit L1 performing both of the zooming operation and the focusing operation effect both of the rotational motion about the optical axis A and the rectilinear movement in the direction of the optical axis A and therefore, the escape portion 5a of the fixed cylinder 5 and the escape portion 8a of the cam ring 8 through which the cam pin 6, etc. become very large as shown in FIG. 2 or 3 and as a result, there has arisen the problem that the fixed cylinder 5 and the cam ring 8 are reduced in their strength.

Further, there has been the problem that the fixed cylinder 5 and cam ring 8 reduced in their strength are liable to be deformed during the working thereof and therefore it is difficult to maintain the working accuracy at a light level.

SUMMARY OF THE INVENTION

In order to solve the above-noted problems, a lens barrel according to the present invention is a lens barrel provided with a lens holding cylinder 1 holding a lens unit L1 and rotatable about an optical axis A, and a holding cylinder rotating mechanism for rotatively moving the lens holding cylinder 1 to thereby drive the lens unit L1 in the direction of the optical axis A, characterized in that the holding cylinder rotating mechanism has a rotating portion 20 disposed outside a fixed cylinder 23 and effecting rotational motion, a rotational motion transmitting portion 20a for transmitting only the rotational motion about the optical axis A of the rotational motion of the rotating portion 20 to the inside of the fixed cylinder 23, and a holding cylinder rotating portion 21 for transmitting the motion of the rotational motion transmitting portion 20a in the direction of the optical axis A and rotating the lens holding cylinder 1.

DESCRIPTION OF THE PREFERRED EMBODIMENT

Figure 1:
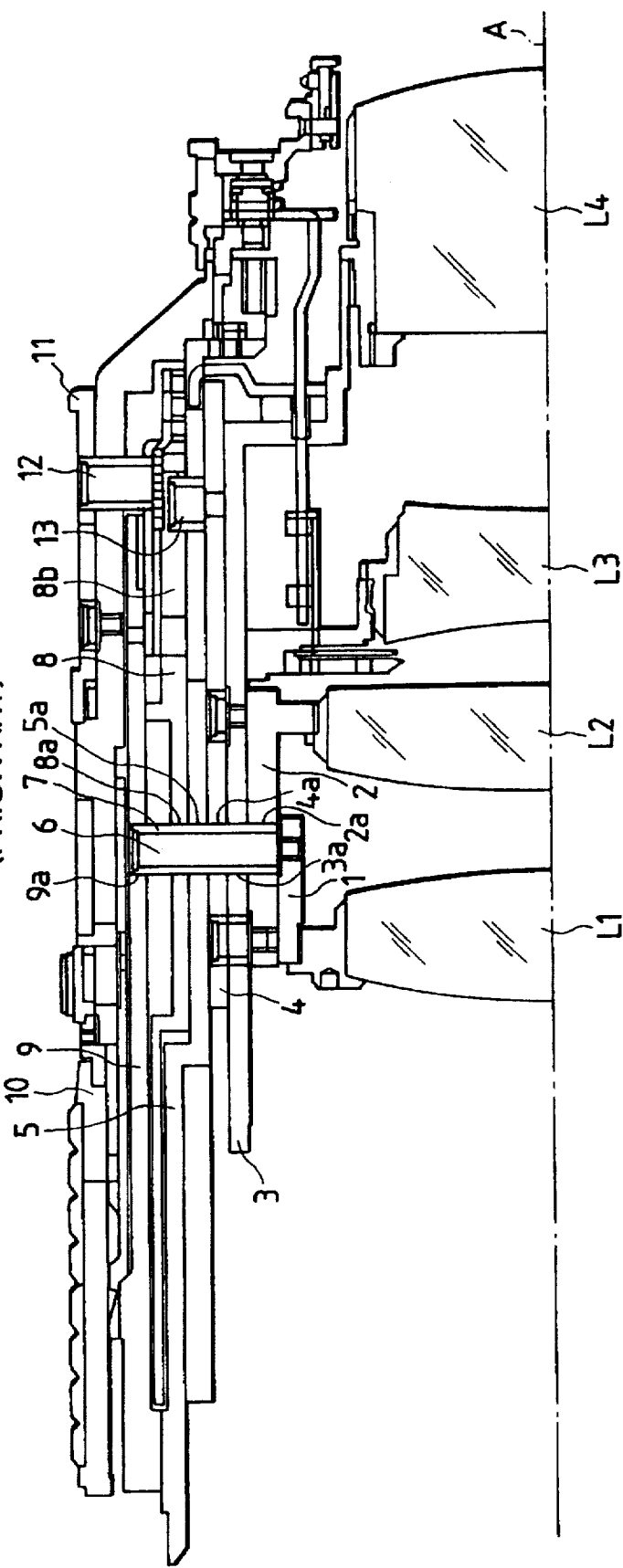
FIG. 1 is a fragmentary cross-sectional view of a lens barrel according to the prior art.
Figure 2:
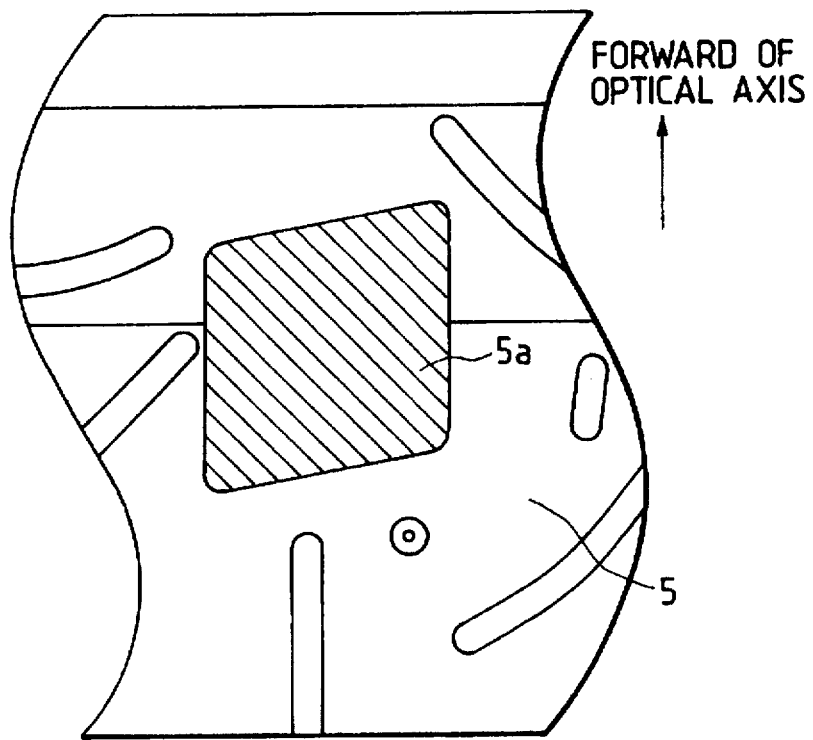
FIG. 2 is a fragmentary developed view of a fixed cylinder 5 in the lens barrel according to the prior art.
Figure 3:
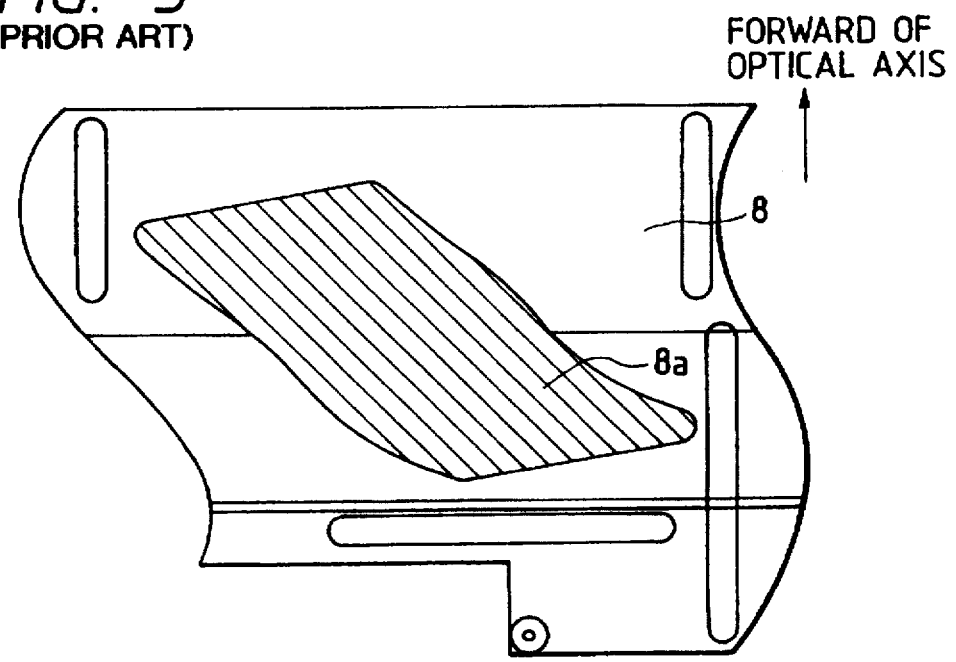
FIG. 3 is a fragmentary developed view of a cam ring 8 in the lens barrel according to the prior art.

An embodiment of the present invention will hereinafter be described with reference to the drawings. In the drawings, portions functionally similar to those in the example of the prior art are given the same reference characters as those in the example of the prior art and the overlapping description thereof will be suitably omitted.

Figure 4:
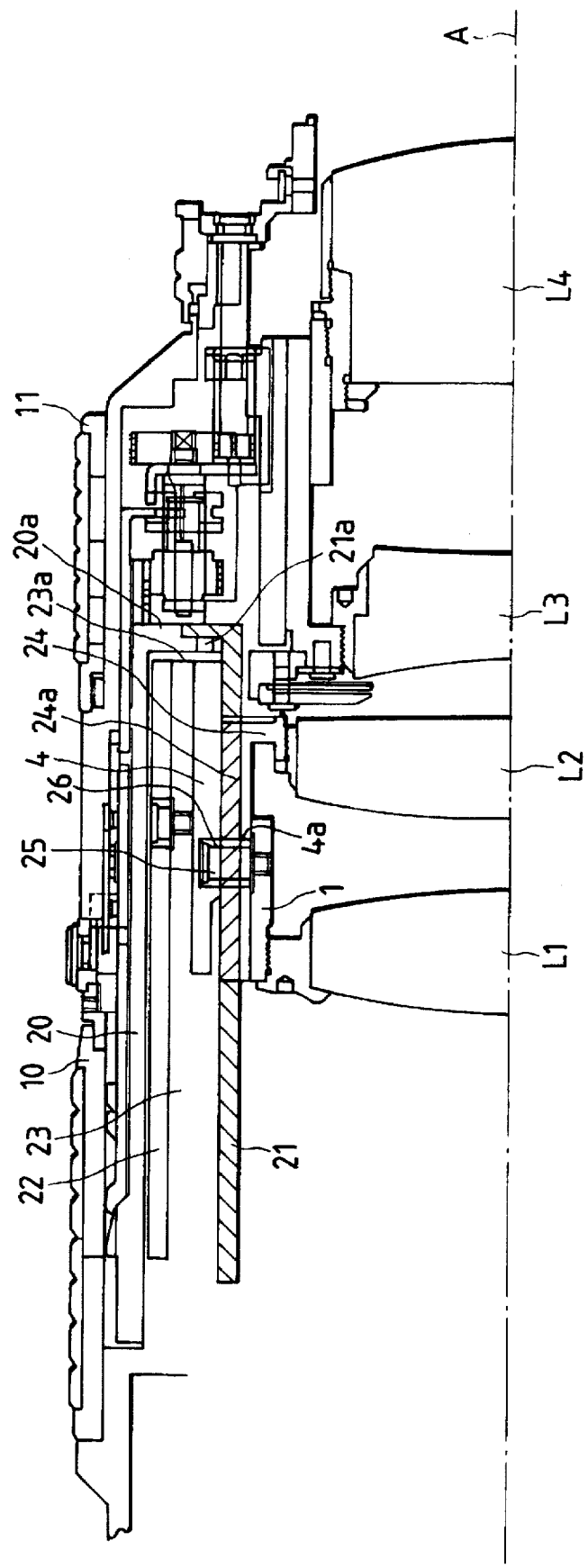
FIG. 4 is a fragmentary cross-sectional view of an embodiment of the present invention.
Figure 5:
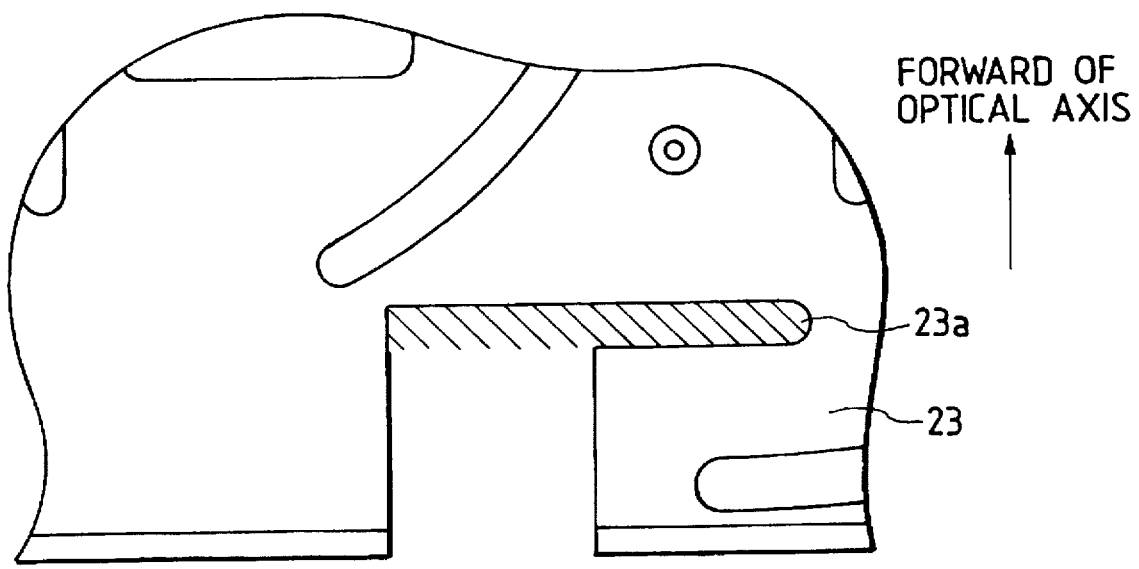
FIG. 5 is a fragmentary developed view of a fixed cylinder 23 in the embodiment of the present invention.
Figure 6:
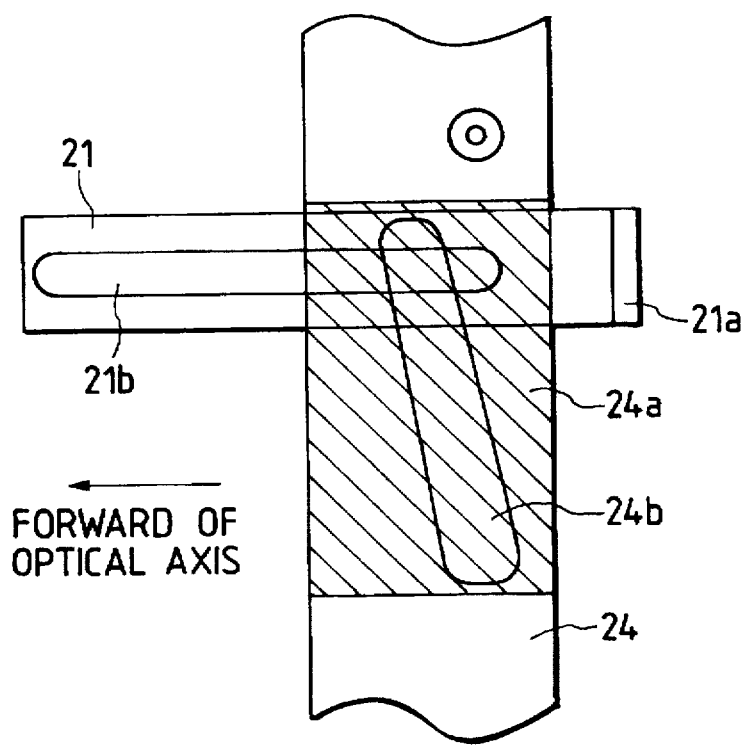
FIG. 6 is a fragmentary developed view of a holding cylinder rotating portion 21 and a slidable cylinder 24 in the embodiment of the present invention.

FIG. 4 is a fragmentary cross-sectional view of the present embodiment. FIG. 5 is a fragmentary developed view of a fixed cylinder 23 used in the present embodiment, and FIG. 6 is a fragmentary developed view of a holding cylinder rotating portion 21 and a slidable cylinder 24.

The present embodiment differs from the example of the prior art chiefly in that the rotational motion of a rotatable cylinder 20 corresponding to the rotatable cylinder 9 in the example of the prior art is transmitted to a slidable cylinder 1 through a rotational motion transmitting portion 20a and the holding cylinder rotating portion 21.

The rotational motion transmitting portion 20a is a region radially extending from the inner peripheral surface of the rear end portion of the rotatable cylinder 20 toward an optical axis A, and passes through the rear of the rear end of a cam ring 22 and extends through an escape portion 23a (see FIG. 5) provided in the fixed cylinder 23 to the inside of the fixed cylinder 23. The rotatable cylinder 20, like the rotatable cylinder 9 in the example of the prior art, obtains a drive force from a focusing ring 10, etc. and effects only rotational motion about the optical axis A and therefore, the rotational motion transmitting portion 20a also is a region which effects only rotational motion and does not move in the direction of the optical axis A.

On the other hand, the holding cylinder rotating portion 21 is a member elongate in the direction of the optical axis A which is disposed parallel to the optical axis A, and the rear end portion 21a thereof is installed on that end portion of the rotational motion transmitting portion 20a which is adjacent to the optical axis. That is, the holding cylinder rotating portion 21 is rotatable about the optical axis A with the rotatable cylinder 20 through the rotational motion transmitting portion 20a. Also, the holding cylinder rotating portion 21 is provided in the central portion thereof a rectilinear groove 21b parallel to the optical axis A. (FIG. 6)

The slidable cylinder 24 is a member corresponding to the slidable cylinder 2 in the example of the prior art, and is fitted to the inner periphery of a cam ring 4 for rectilinear movement in the direction of the optical axis A. Also, a groove portion 24a is provided on the outer peripheral side of the slidable cylinder 24, as shown in FIG. 6. This groove portion 24a is for passing the holding cylinder rotating portion 21 therethrough, and is a groove portion sufficiently wide in the circumferential direction so that the holding cylinder rotating portion 21 can freely effect rotational motion in accordance with the focusing operation.

A cam pin 25 and a roller 26 (hereinafter referred to as the "cam pin 25, etc.") installed on the outer peripheral surface of the slidable cylinder 1 are members corresponding to the cam pin 6, etc. in the example of the prior art, but the full length of these is short and they differ from the cam pin 6, etc. in that they do not extend through the fixed cylinder 23, the cam ring 22, etc. In the present embodiment, the cam pin 25, etc. extend through the escape groove 24b of the slidable cylinder 24 and the rectilinear groove 21b of the holding cylinder rotating portion 21 and have their tip end portions engaged with a cam slot 4a formed in the inner peripheral surface of the cam ring 4. Accordingly, the cam pin 25, etc. have transmitted thereto the rotational motion of the holding cylinder rotating portion 21 through the rectilinear groove and as a result, move back and forth in the direction of the optical axis along the shape of the cam slot 4a.

The focusing operation in the present embodiment will now be described.

When the focusing operation is to be performed in the present embodiment, as in the example of the prior art, power is transmitted from a power source installed in a camera body to the rotatable cylinder 20 through a power transmitting mechanism, not shown, or the rotational motion of the focusing ring 10 manually operated is transmitted to the rotatable cylinder 20 to thereby rotate the rotatable cylinder 20. Next, the rotational motion of the rotatable cylinder 20 is transmitted to the holding cylinder rotating portion 21 disposed inside the fixed cylinder 23 through the rotational motion transmitting portion 20a, whereby the holding cylinder rotating portion 21 effects rotational motion with the rotatable cylinder 20.

Next, the rotational motion of the holding cylinder rotating portion 21 is transmitted to the cam pin 25, etc. through the rectilinear groove 21b. At this time, the cam ring 4 is immovable in the direction of rotation about the optical axis A and therefore, the cam pin 25, etc. effect movement relative to the cam slot 4a and move back and forth in the direction of the optical axis A along the shape of the cam slot 4a. Thereby, the slidable cylinder 1 is moved back and fourth in the direction of the optical axis A while rotating, and a lens unit L1 becomes disposed at a position whereat the optical system is in focus.

The zooming operation in the present embodiment will now be described.

When the zooming operation is to be performed, a zoom ring 11 is rotated by an extraneous operation. The rotational motion of the zoom ring 11 is transmitted to the cam ring 4 through a mechanism (not shown) similar to that in the example of the prior art. On the other hand, the rotatable cylinder 20 is inhibited from rotational motion by the aforedescribed power transmitting mechanism or the like and therefore, the holding cylinder rotating portion 21 and the cam pin 25, etc. are also immovable in the direction of rotation. Accordingly, relative motion takes place between the cam pin 25, etc. and the cam slot 4a, and the cam pin 25, etc. move back and forth in the direction of the optical axis A along the shape of the cam slot 4a. As a result, the slidable cylinder 1 does not rotate, but rectilinearly moves in the direction of the optical axis A and the lens unit L1 becomes disposed at a position whereat the optical system realizes a focal length to be found.

As described above, in the present embodiment, when the focusing operation is to be performed, the rotational motion of the rotatable cylinder 20 is transmitted from the outside to the inside of the fixed cylinder 23 through the rotational motion transmitting portion 20a. Here, the motion effected by the rotational motion transmitting portion 20a is only the rotational motion about the optical axis A, and in this point, the present embodiment greatly differs from the prior-art lens barrel in which the power from the rotatable cylinder 9 is introduced to the inside of the fixed cylinder 5 through the cam pin 6, etc. which effect both of the motion about the optical axis A and the motion in the direction of the optical axis A. Therefore, the escape portion 23a provided in the fixed cylinder 23 to permit the rotational motion transmitting portion 20a to extend therethrough may suffice if it is of a shape elongate in the circumferential direction, and is more greatly reduced in its area than the escape portion 5a in the prior-art lens barrel. As a result, it is possible for the fixed cylinder 23 in the present embodiment to maintain its strength high even if the escape portion 23a is provided, and to improve the working accuracy because the strength is thus increased.

Also, in the present embodiment, the power transmitted to the fixed cylinder 23 by the rotational motion transmitting portion 20a is transmitted to any position in the direction of the optical axis A by the holding cylinder rotating portion 21. Accordingly, it is possible to dispose the rotational motion transmitting portion 20a at the best suited position in the direction of the optical axis in designing the entire lens barrel, whereby the degree of freedom of design of the lens barrel is increased. So, in the present embodiment, the rotational motion transmitting portion 20a is disposed rearwardly of the rear end portion of the cam ring 22 to thereby avoid providing an escape groove in the cam ring 22, thus solving the problem such as the reduced strength of the cam ring 8 in the example of the prior art.

The present invention is not restricted to the above-described embodiment. The above-described embodiment is illustrative, and any form which has substantially the same construction as the technical idea described in the appended claims and achieves an effect similar to that described above is covered by the technical scope of the present invention.

As described in detail above, according to the present invention, it becomes possible to provide a lens barrel in which the holding cylinder rotating mechanism has a rotatable portion, a rotational motion transmitting portion and a holding cylinder rotating portion and of the rotational motion created in the rotatable portion, only the rotational motion about the optical axis is transmitted to the inside of the fixed cylinder by the rotational motion transmitting portion, and inside the fixed cylinder, the lens holding cylinder is rotated through the holding cylinder rotating portion and therefore the strength of the fixed cylinder, etc. is high and the working accuracy is good.

What is claimed is:

1. A lens barrel including:

a lens holding cylinder holding a lens unit and rotatable about the optical axis of said lens barrel; and a holding cylinder rotating mechanism for rotatively moving said lens holding cylinder to thereby move said lens unit along said optical axis;

said holding cylinder rotating mechanism having:
  a rotating portion disposed outside a fixed cylinder having rotational motion;
  a rotational motion transmitting portion for transmitting only the rotational motion about said optical axis of the rotational motion of said rotating portion to the inside of said fixed cylinder; and
  a holding cylinder rotating portions for transmitting the motion of said rotational motion transmitting portion along the direction of said optical axis and rotating said lens holding cylinder.

2. A lens barrel including:

a fixed cylinder;

a rotatable portion disposed outside said fixed cylinder and rotatable about the optical axis of said lens barrel;

an escape portion provided circumferentially of said fixed cylinder;

a rotational motion transmitting portion extending from said rotatable portion through said escape portion and radially toward said optical axis;

said rotational motion transmitting portion being rotatable about said optical axis, but immovable along said optical axis;

a holding cylinder rotating portion disposed inside said fixed cylinder and engaged with said rotational motion transmitting portion and rotatable with said rotatable portion;

said holding cylinder rotating portion having a rectilinear groove;

a cam ring rotatably disposed between said fixed cylinder and said holding cylinder rotating portion;

said cam ring having a cam slot;

a lens unit;

a lens holding cylinder holding said lens unit; and a cam pin fixed to said lens holding cylinder and extending through said rectilinear groove and engaged with said cam slot.

3. A lens barrel according to claim 2, further including:

a focusing ring for moving said lens unit for the purpose of focusing;

said rotatable portion being rotated in operative association with the rotation of said focusing ring;

whereby the rotation of said focusing ring rotates said rotatable portion, the rotation of said rotatable portion is transmitted to said holding cylinder rotating portion by said rotational motion transmitting portion, said cam pin engaged with said rectilinear groove of said holding cylinder rotating portion is rotated about said optical axis and at the same time, said cam pin is moved along the direction of said optical axis by the action of the cam slot of said cam ring, and said lens holding cylinder and said lens unit are moved along the direction of said optical axis for focusing.

4. A lens barrel according to claim 2, further including:

a zoom ring for moving said lens unit to change the focal length thereof;

said cam ring being rotated in operative association with the rotation of said zoom ring;

whereby the rotation of said zoom ring rotates said cam ring, and by the rotation of said cam ring, said cam pin is moved along the direction of said optical axis with the aid of the action of the cam slot of said cam ring and said rectilinear groove of said holding cylinder rotating portion, and said lens holding cylinder and said lens unit are moved along the direction of said optical axis to change the focal length.

5. A lens barrel including:

a fixed cylinder;

a rotatable portion disposed outside said fixed cylinder and rotatable about the optical axis of said lens barrel;

a holding cylinder rotating portion disposed inside said fixed cylinder and rotatable about said optical axis;

a rotational motion transmitting portion for transmitting the rotation of said rotatable portion to said holding cylinder rotating portion;

said rotational motion transmitting portion being rotatable about said optical axis, but immovable along said optical axis;

a lens holding cylinder holding a lens unit; and cam means for moving said lens holding cylinder along said optical axis by the rotation of said holding cylinder rotating portion.

* * * * *

UNITED STATES PATENT AND TRADEMARK OFFICE
CERTIFICATE OF CORRECTION

PATENT NO. : 5,694,254
DATED : December 2, 1997
INVENTOR(S) : Masatsune TANAKA, et al It is certified that error appears in the above-identified patent and that said Letters Patent is hereby corrected as shown below:

Title page,
Section [73] Assignee: add --Tochigi Nikon Corporation, Tochigi-ken, Japan--.

Signed and Sealed this

Thirtieth Day of June, 1998

Attest:

BRUCE LEHMAN

Attesting Officer

Commissioner of Patents and Trademarks